(12) United States Patent
Schulz

(10) Patent No.: US 8,063,377 B2
(45) Date of Patent: Nov. 22, 2011

(54) CRYSTAL IDENTIFICATION FOR HIGH RESOLUTION NUCLEAR IMAGING

(75) Inventor: Volkmar Schulz, Wuerselen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 172 days.

(21) Appl. No.: 12/535,730

(22) Filed: Aug. 5, 2009

(65) Prior Publication Data

US 2010/0038546 A1    Feb. 18, 2010

Related U.S. Application Data

(60) Provisional application No. 61/089,130, filed on Aug. 15, 2008.

(51) Int. Cl.
*G01T 1/20*      (2006.01)
*G01T 1/166*    (2006.01)

(52) U.S. Cl. .................. 250/366; 250/363.04; 250/368

(58) Field of Classification Search ............. 250/361 R, 250/363.02, 363.03, 363.04, 366, 368, 369, 250/370.01, 370.08, 370.1, 370.11
See application file for complete search history.

(56) References Cited

U.S. PATENT DOCUMENTS
6,194,728 B1 * 2/2001 Bosnjakovic ............ 250/370.11

FOREIGN PATENT DOCUMENTS
WO   2007023401 A1   3/2007
WO   2008052965 A1   5/2008

OTHER PUBLICATIONS

Moehrs, et al. "A Small-Animal PET Design Using SiPMs and Anger Logic with Intrinsic DOI", 2004 IEEE Nuclear Science Symposium Conference Record Oct. 16-22, 2004, Rome, Italy, v. 6, Oct. 22, 2004, pp. 3475-2479 XP002413443.

* cited by examiner

*Primary Examiner* — Mark R Gaworecki

(57) ABSTRACT

A detector for a nuclear imaging system includes a scintillator including an array of scintillator elements and a light guide including a grid which defines light guide elements. Light from scintillations in the scintillation crystal in response to received radiation, passes through the light guide and strikes light sensitive elements of a light sensitive element array. The light sensitive element array includes larger elements in an array in the center surrounded by smaller light sensitive elements located in a peripheral array around the central array.

23 Claims, 5 Drawing Sheets

CRYSTAL IDENTIFICATION FOR HIGH RESOLUTION NUCLEAR IMAGING

CROSS REFERENCE TO RELATED APPLICATIONS

This application claims the benefit of U.S. provisional application Ser. No. 61/089,130 filed Aug. 15, 2008, which is incorporated herein by reference.

DESCRIPTION

The present application relates to the art of nuclear detectors. It finds particular application in conjunction with high resolution photon emission tomography (PET) imaging systems for clinical or animal studies. However, it is to be appreciated that the present technology will also be applicable to other high resolution applications such as human brain imaging, high resolution human imaging, SPECT imaging, and the like.

Historically, nuclear imaging systems included a scintillator layer, an optical coupling layer, and an array of photomultiplier tubes. Photomultiplier tubes were typically on the order of 10-20 cm in diameter and were arranged in a closed packed array to receive light from scintillations via the optical coupling layer. Anger logic was used on the output signals from the photomultiplier tubes to determine the location of each scintillation on the scintillator layer. That is, each scintillation was sensed by a plurality of the photomultiplier tubes. Based on the relative strength of the scintillation signal from each tube viewing the scintillation, the location or coordinates of each scintillation on the detector was calculated.

To improve resolution and overcome various problems with photomultiplier tubes, nuclear detectors have been developed which include an array of small solid-state light sensors, e.g. silicon photomultipliers (SiPM) coupled to scintillation crystals which typically have sizes on the order of a few millimeters by a few millimeters. In an imaging system in which each scintillation is detected by a single solid-state light detector which is 4×4 mm, for example, resolution on the order of 4 mm is readily achieved. Decreasing the detector size, e.g., to 1×1 mm, to improve resolution has drawbacks. In a PET imaging system, the detectors are typically positioned in a ring on the order of 60 cm in diameter and 20-30 cm wide. The very large number of 1×1 mm light sensors needed to cover this area would create numerous manufacturing and data readout problems.

In the quest for higher resolution solid-state systems, Anger logic has been used to attain a resolution which is superior to the size of the light sensing element. By using a scintillator or a pixilated scintillator layer, a light-guide, and a layer of larger solid-state light sensing elements with Anger logic, resolution can be improved. For example, the light sensing elements might be 4×4 mm. Anger logic may be used to identify the location of the scintillation to a resolution of 1 mm or better.

The combination of Anger logic and solid-state light sensing elements works well in the center of a detector where there is a ring of light sensing elements that surrounds each scintillation. However, at adjacent edges of a detector section, the Anger logic becomes inaccurate. Specifically, when light is only sensed over part of the ring, e.g., when light only to one side of the scintillation is sensed, the accuracy or resolution with which the location of the scintillation event can be identified is compromised.

The present application proposes a solution to the above-referenced problems and others.

In accordance with one aspect, a detector for a nuclear imaging system is provided. It includes a scintillator which converts received radiation into light scintillations and a light sensitive element array which includes light sensing elements having at least two different cross-sectional sizes including at least a larger light scanning element and a smaller light scanning element.

In accordance with another aspect, a method of detecting radiation events is provided. Incident radiation is received with a scintillator and converted into light scintillations. The light from each scintillation is guided to a detector array which includes detector elements of at least two different sizes.

In accordance with another aspect, a method of constructing a nuclear imaging detector is provided. A detector array having a plurality of detector elements including detector elements of at least two different sizes is defined. A scintillator is optically coupled to the detector array.

One advantage resides in improved resolution adjacent edges of a nuclear detector array.

Another advantage resides in substantially uniform resolution across a detector array from edge to edge.

Another advantage resides in simplicity of manufacture.

Another advantage resides in a reduced number of readout channels and low complexity.

Still further advantages and benefits will become apparent to those of ordinary skill in the art upon reading and understanding the following detailed description.

The invention may take form in various components and arrangements of components, and in various steps and arrangements of steps. The drawings are only for purposes of illustrating the preferred embodiments and are not to be construed as limiting the invention.

Figure 1:
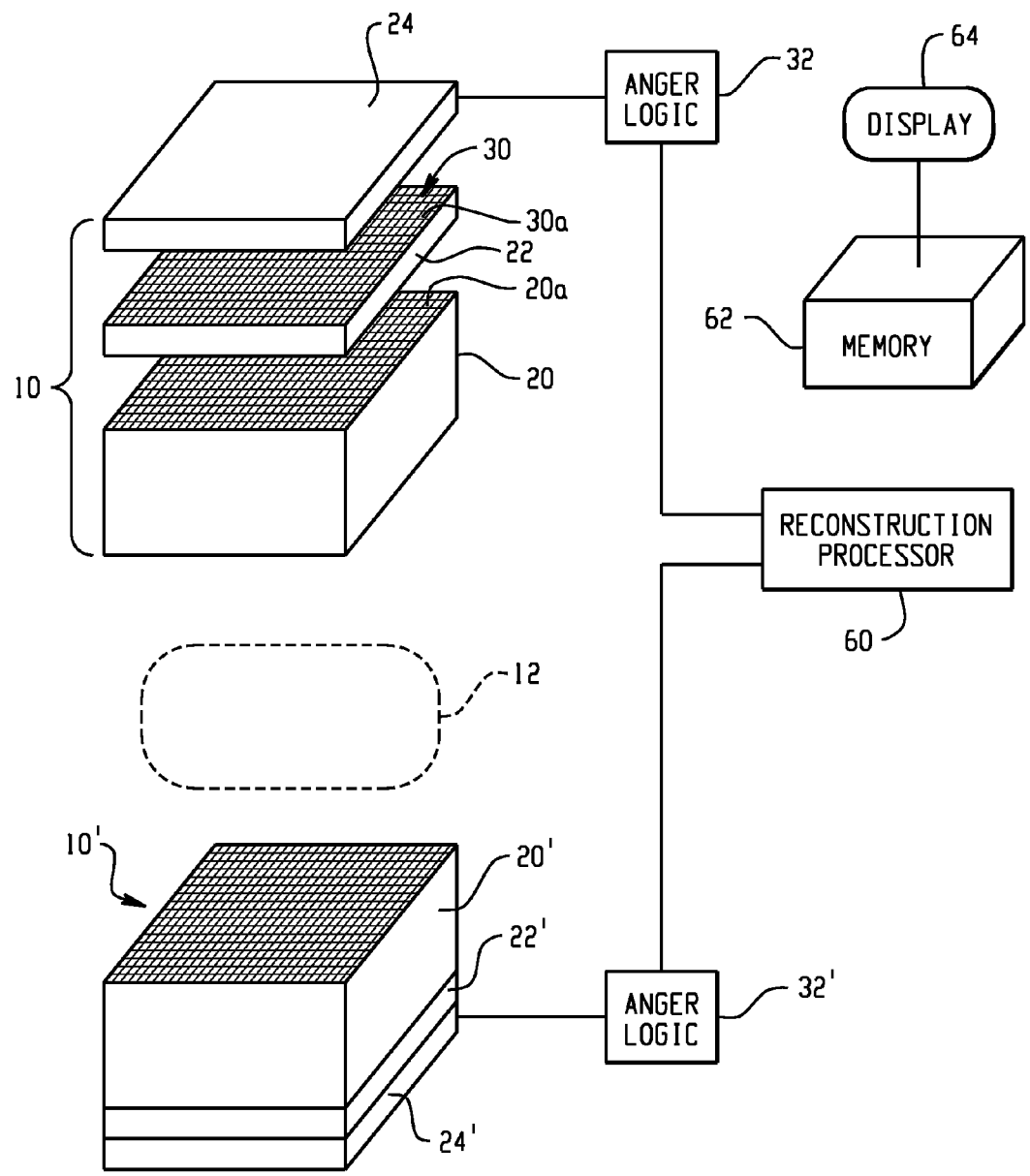
FIG. 1 is a diagrammatic illustration of a nuclear imaging system in accordance with the present concept.
Figure 2:
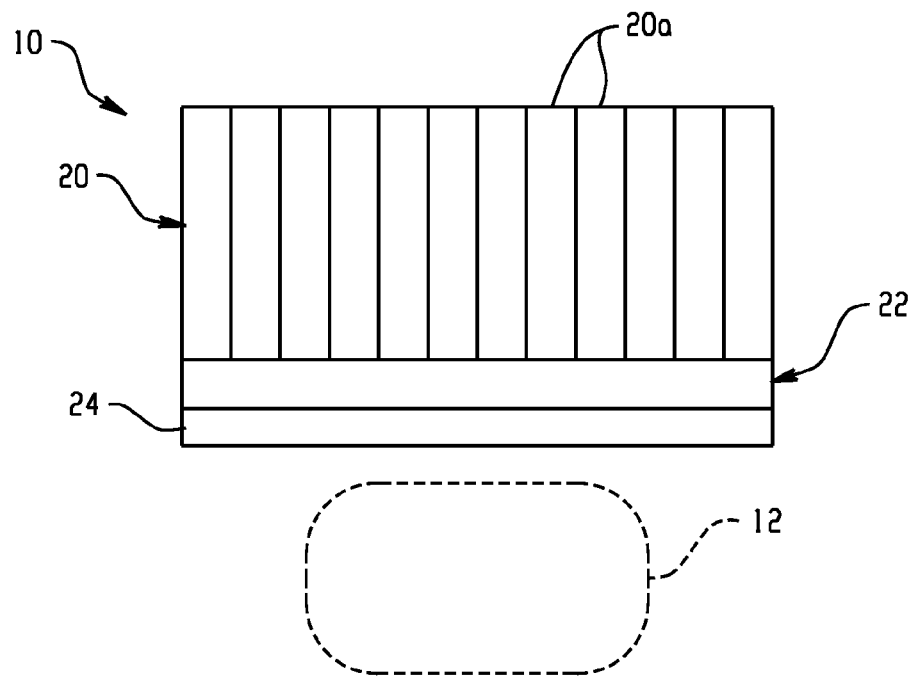
FIG. 2 is a side view of a the detector array of FIG. 1.

With reference to FIGS. 1 and 2, a nuclear imaging system includes at least one detector 10 disposed adjacent an examination region 12. A subject positioned in the imaging region 12 has received a radiopharmaceutical which emits gamma rays or other radiation of characteristic energy, which radiation is received by the detector 10. Although some SPECT cameras use a single detector, many SPECT cameras include at least one additional detector 10', and may include more. In a PET imaging system, a larger plurality of detectors 10, 10' are positioned edge to edge in a ring around the imaging region 12. In PET imaging, each radiation event generates a pair of 511 keV gamma rays. By determining the locations on detectors on opposite sides of the imaging region at which a pair of gamma rays is received coincidently, the trajectory along which each radiation occurred can be determined.

Each detector 10 includes a scintillator 20. In the illustrated embodiment, the scintillator is a pixelated scintillator. That is, the scintillator is an array of scintillator elements 20a, each coated on all but a light output surface with a reflective material. Alternately, the scintillator can be a continuous scintillator slab. The light output surfaces of each scintillator are optically coupled to a light guide 22. The light guide transmits light from the scintillators to a photosensor or light sensing element array 24. The photosensor array includes an array of solid-state photosensing or light sensing elements, such as a silicon photomultiplier (SiPM) array.

Figure 3:
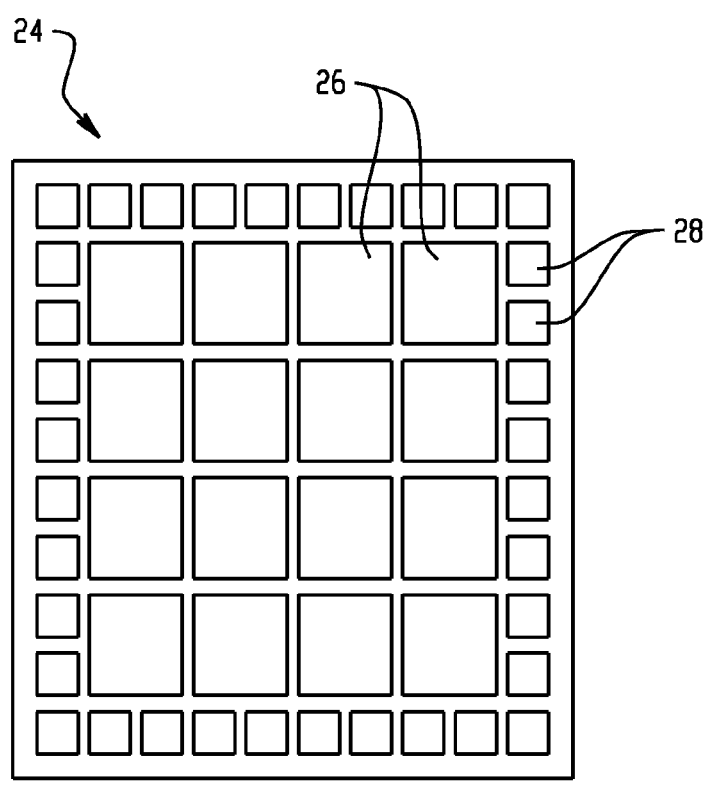
FIG. 3 is a front view of one embodiment of the photosensor array of FIG. 1.

With continuing reference to FIG. 1 and further reference to FIG. 3, the photosensor array 24 includes two or more cross-sectional sizes e.g., an inner array of larger photosensing elements 26 and a peripheral array or border of smaller photosensing elements 28. The larger photosensing elements 26 of the inner array may, for example, be 4×4 mm, although larger and smaller photosensors are contemplated. The peripheral array of smaller photosensors 28 may, for example, be 2×2 mm or 1×1 mm, although other photosensor sizes are also contemplated. Optionally, an intermediate ring of photodetectors between the inner and peripheral arrays may be provided. In one example, the inner array may include 4×4 mm SiPMs, the intermediate array 2×2 mm SiPMs, and the peripheral array 1×1 mm SiPMs. It is to be appreciated that the cross-sectional size of the light sensing elements and the cross-sectional size of the individual scintillator elements of a pixelated scintillator array need not match. Rather, the cross-sectional size of the scintillator elements 20a in the illustrated embodiment is smaller than the cross-sectional size of the larger light sensitive elements 26. The cross-sectional area of the scintillator elements of the scintillator array strongly influences the resolution of the detector. The smaller the cross-sectional size of the individual scintillator elements, the finer is the resolution. Accordingly, it may be advantageous to have a scintillator array in which individual elements have a cross-sectional size of 1×1 mm, for example, and a photosensor array in which the larger photosensors 26 have a cross-sectional size or face size of 4×4 mm, and the peripheral photosensor elements have a cross-sectional size or face area of 2×2 mm.

The light guide 24 conducts light from the output face of each scintillator element to the photosensor array. The light guide typically permits the light from scintillators in each photosensor element 20a to travel to the photosensitive elements below the light emitting scintillator. In one embodiment, the light guide 22 includes a grid 30 which defines light guide elements 30a that match the cross-sectional size of the scintillator elements to direct light from each scintillator element substantially straight downward with minimal divergence or cone angle.

An Anger logic circuit 32, 32' is associated with each detector 10, 10'. The Anger logic circuit applies Anger logic to output signals from the photosensor elements that view each scintillation to determine in which scintillator element of the scintillator array each scintillation occurred.

Figure 4:
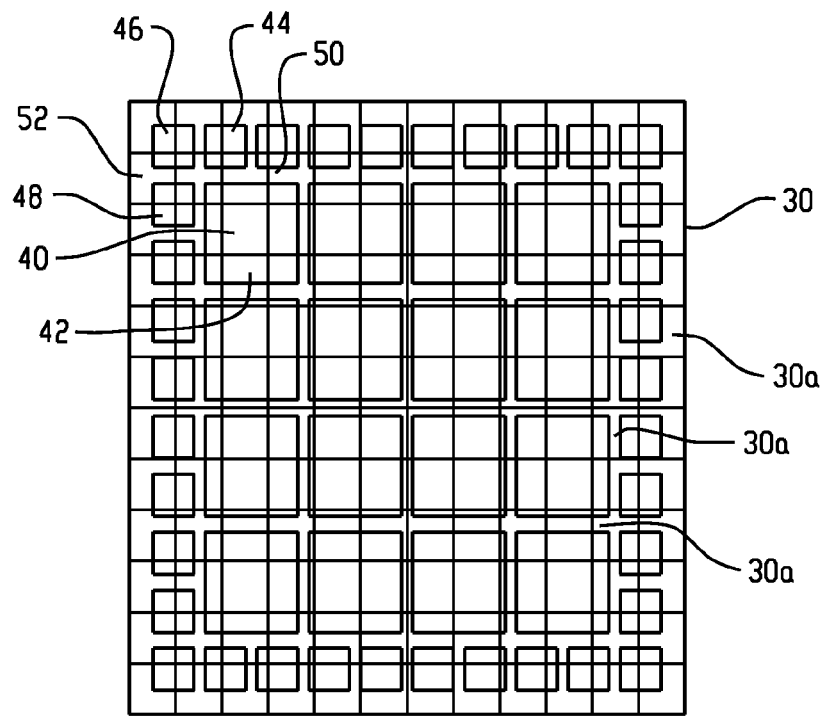
FIG. 4 is an illustration of the embodiment of FIG. 3 with a light guide superimposed on the photosensor array.

With particular reference to FIG. 4, if light is emitted from the scintillator element directly above a light guide element 40, substantially all of the light will be received by the light sensor element 42. Thus, whenever an output pulse from light sensor element 42 indicates that substantially all of the emitted light was emitted by the scintillator corresponding to light guide element 40, the Anger logic circuit 32 maps the received signal to the location of scintillator element and light guide element 40. In another example, when the light is received by scintillator elements 42, 44, 46, and 48, the near equally sized output pulses from light sensitive elements 42, 44, 46, and 48 will be mapped by the Anger logic circuit to a light scintillation, hence a radiation event being received in scintillator element above light guide element 50. When a radiation event causes a scintillation which is received only by light sensitive elements 46 and 48, the Anger logic circuit maps the output signals from these two detectors as being indicative of the scintillation event having occurred in scintillator above light guide element 52. Similarly, the Anger logic is predesigned or calibrated to analyze the output pulses of each element of the scintillator array and to determine from the light sensitive elements which emit pulses and their relative amplitudes, the scintillator element in which the scintillation event occurred or the light guide element above which the scintillation occurred.

The light sensing elements disposed along the edge are sized such that light that travels through each light guide element 50 strikes a unique light sensing element or combination of light sensing elements. The light receiving element adjacent the edge should be small enough that light from an edge light guide element and light from an adjacent light guide element that is one element in from the edge illuminate a different scintillator or combination of scintillators.

With reference again to FIG. 1, a reconstruction processor 60 receives signals from the Anger logic circuits 32, 32' of each detector 10, 10' indicative of the detector and the location or coordinates on that detection at which each scintillation event occurred. Using conventional nuclear camera reconstruction techniques, such as those developed for PET or SPECT, the reconstruction processor reconstructs a three-dimensional map indicative of the locations within the subject at which radiation decay events occurred. Locations within the subject having relatively high concentrations of the injected radiopharmaceutical will be identified in the image reconstruction as having a large number of radiation events or high concentration of the radiopharmaceutical. The signals from the detectors can be accumulated and reconstructed into the image representation in a post-processing technique. Alternately, the reconstruction processor can reconstruct the image representation as the radiation events are received by the detector. In PET imaging, reconstructing each detected radiation event or small batches of events substantially as they occur is often denoted as a "list-mode" data collection or reconstruction technique.

The reconstructed image representations are stored in an image memory 62 which may be a part of the nuclear imaging system, a central medical facility database, or the like. Images from the memory are withdrawn for display on a display device 64 such as a video monitor, a printout or the like. With a high speed electronic data communications, the display may be located at a remote area of the medical facility, in another medical facility, or the like. Further, multiple displays can be generated concurrently. In this manner, specialists in many different locations may consult and confer in reaching a diagnosis or other diagnostic image evaluation.

Figure 5:
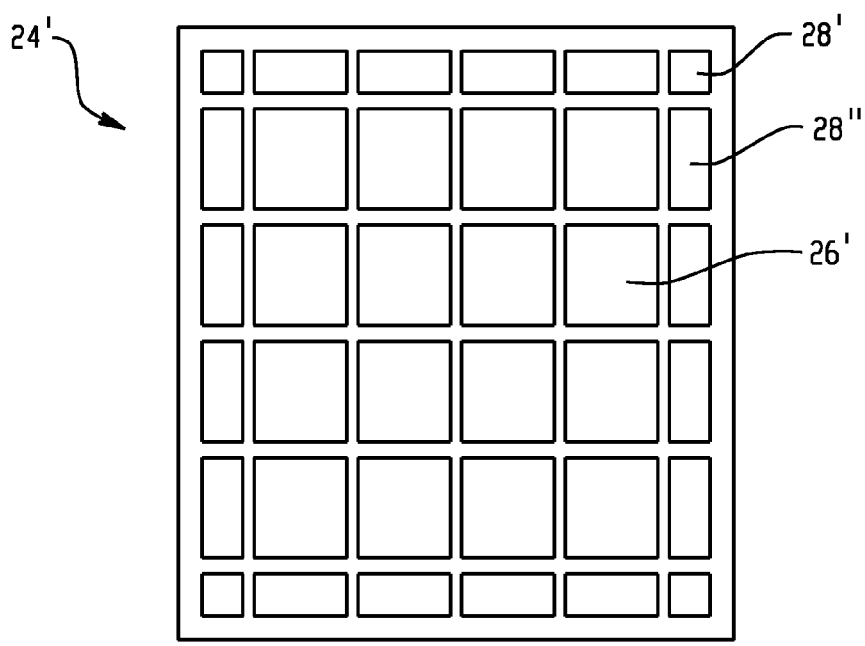
FIG. 5 is a front view of a second embodiment of the photosensor array.
Figure 6:
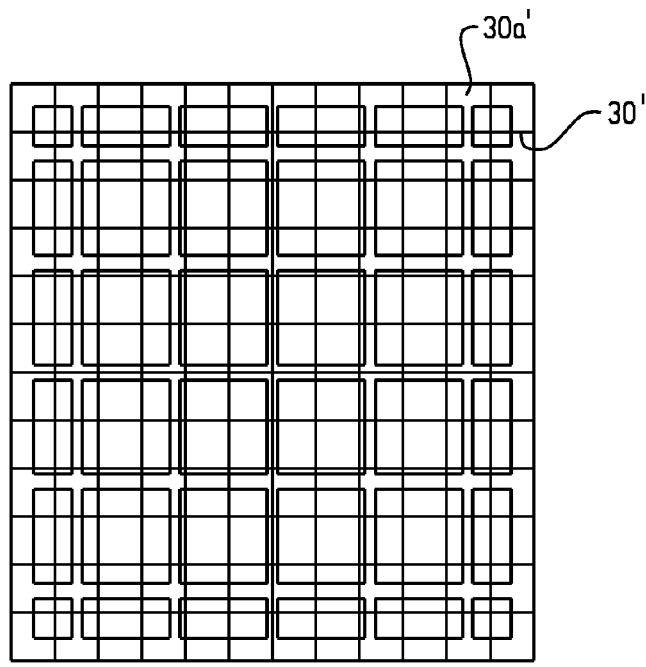
FIG. 6 is a front view of the photosensor array of FIG. 5 with a light guide superimposed thereon.

In the embodiment of FIGS. 5 and 6, the peripheral array includes scintillator elements 28', 28" of more than one size and at least some of which are not square. As can be seen from FIG. 6, the unique response of the photosensitive elements 26', 28', 28" to light emitted by each scintillator element or light guide element 30a can be uniquely mapped by the Anger logic circuit. Although square and rectangular elements are shown for simplicity of illustration, it is to be appreciated that the scintillator elements and/or the light guide elements and/or photosensitive elements do not need to be square or rectangular. Various other regular or irregular shapes are also contemplated.

PET imaging systems typically include a plurality of detector arrays 10, 10' mounted end to end. If a continuous detector is constructed which completely encircles the imaging region 12, photosensor elements of smaller cross-sectional size may be used only along the two edges. Although the cross-sectional size of the scintillator elements 28 and light guide elements 30*a* are illustrated as about a quarter of the cross-sectional size of the larger light receiving elements 26 in the center array and about the same or half the cross-sectional size as the smaller light sensing elements 28, 28', 28" in the peripheral array, it is to be appreciated that other relative sizes are also contemplated. Moreover, it is contemplated the smaller photosensor elements might also be located periodically or at selected locations within the central array of photosensor elements. For manufacturing simplicity, it is advantageous to use the smallest number of photosensitive elements which can uniquely map the light output from a given scintillator element array. For simplicity in manufacturing the photosensitive array 24, it can be divided into elements of the smallest size. The outputs of groups of the smaller sized photosensor elements can be coupled with the group defining the larger photosensitive element 26.

Figure 7:
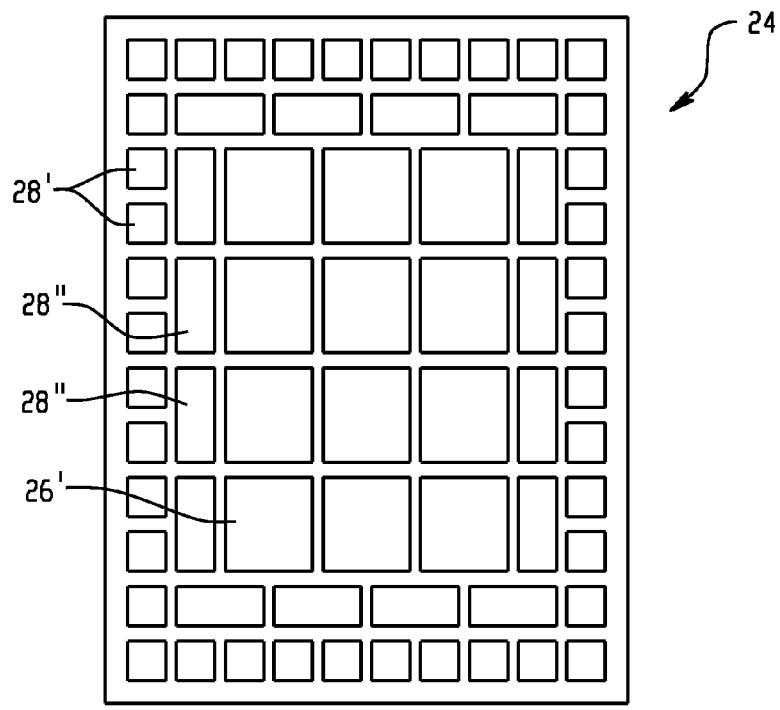
FIG. 7 is a front view of another embodiment of the light sensing element array; and, FIG. 8 is yet another embodiment of the light sensing element array.
Figure 8:
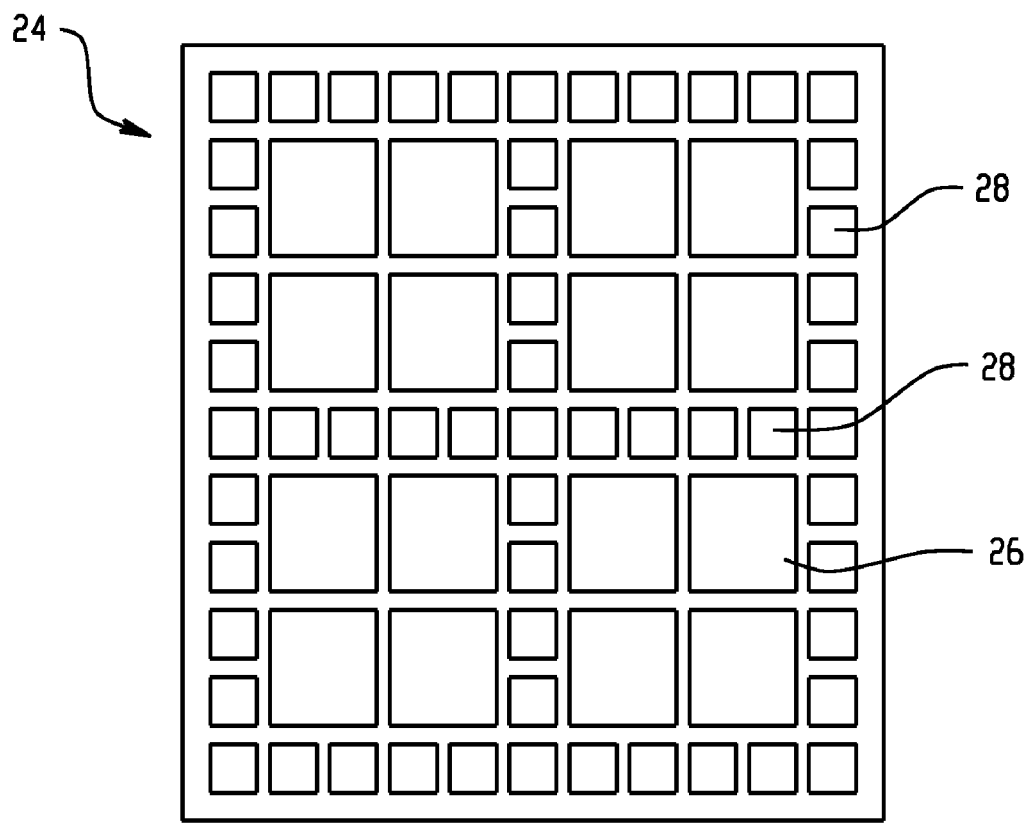

FIG. 7 illustrates another embodiment with small 28', medium 28", and large 26' light sensing elements disposed in three rings. FIG. 8 illustrates an embodiment in which smaller light sensing elements 28 are disposed in a regular pattern amid the larger light sensing elements 26.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. A detector for a nuclear imaging system comprising:
a scintillator which converts received radiation into light scintillations;
a light sensitive element array including at least larger light sensing elements and smaller light sensing elements; and
a light guide which optically couples the scintillator and the light sensitive element array, the light guide including a grid which defines a plurality of light guide elements.

2. The detector according to claim 1, wherein the scintillator includes an array of scintillator elements.

3. The detector according to claim 1, wherein the larger and smaller light sensing elements are sized such that light from each of the light guide elements, including light from light guide elements adjacent an edge of the detector, illuminate a unique light sensing element or combination of light sensing elements.

4. The detector according to claim 1, wherein the scintillator includes a plurality of scintillator elements and the scintillator elements and the light guide elements have a common cross-section and are aligned.

5. The detector according to claim 1, wherein each of the light guide elements are smaller in cross-sectional size than a cross-sectional size of at least the larger light sensing elements.

6. The detector according to claim 1, wherein the light sensing element array includes light sensing elements of at least three different cross-sectional sizes.

7. The detector according to claim 6, wherein the light sensing elements are disposed in at least three rings with the larger light sensitive elements centrally located and the smaller light sensitive elements located peripherally.

8. A method of PET imaging comprising:
detecting radiation events with a plurality of detectors according to claim 1;
determining a location on each detector at which each radiation event is received;
reconstructing the radiation event locations into a diagnostic image representation; and
converting at least a portion of the diagnostic image representation into a human-readable display.

9. A nuclear imaging system including:
a plurality of detectors according to claim 1;
a reconstruction processor for reconstructing outputs from the detectors into an image representation;
a display for displaying at least a portion of the reconstructed image representation.

10. A detector for a nuclear imaging system comprising:
a scintillator which converts received radiation into light scintillations;
a light sensitive element array including a plurality of larger solid-state light sensing elements and a first plurality of smaller solid-state light sensing elements, the plurality of larger light sensing elements being disposed in a central array and the first plurality of the smaller light sensing elements being disposed peripherally around and encircling the central array of the larger light sensing elements.

11. The detector according to claim 10, wherein each of the larger light sensing elements have a square light sensing face.

12. The detector according to claim 10, wherein the smaller light sensing elements have a cross-sectional size which is one of substantially one quarter of a cross-sectional size of the larger light sensing elements and substantially one half the cross-sectional size of the larger light sensing elements.

13. The detector according to claim 10, wherein the first plurality of the smaller light sensing elements located peripherally around the larger elements includes smaller light sensitive elements of at least two different sizes.

14. The detector according to claim 10, further including a second plurality of the smaller light sensing elements, the second plurality of the smaller light sensing elements being disposed among the plurality of the larger light sensing elements in the central array.

15. The detector according to claim 10, further including an Anger logic circuit connected with the light sensing circuit array which maps output signals from light sensing elements of the array to a location on the scintillator at which each scintillation event occurred.

16. A nuclear imaging system including:
at least one detector and Anger logic circuit according to claim 15;
a reconstruction processor for reconstructing outputs of the Anger logic circuit into an image representation;
a display for displaying at least a portion of the reconstructed image representation.

17. The nuclear imaging system according to claim 16, further including:
a plurality of the detectors disposed in a ring surrounding an imaging region and wherein the reconstruction processor performs a positron emission tomography (PET) reconstruction technique.

18. A method of PET imaging comprising:
detecting radiation events with a plurality of detectors according to claim 10;
determining a location on each detector at which each radiation event is received;
reconstructing the radiation event locations into a diagnostic image representation; and
converting at least a portion of the diagnostic image representation into a human-readable display.

19. A method of detecting radiation events comprising:
receiving incident radiation with a scintillator and converting the received radiation into a light scintillation;
guiding the light from the scintillation through an array of light guide elements to a solid-state light sensing element array, the light sensing element array including light sensing elements of at least two different sizes, the light from each light guide element illuminating a unique combination of the light sensing elements.

20. The method according to claim 19, wherein the light sensing elements disposed adjacent a periphery of the light sensing element array are smaller than at least some of the light sensing elements in a central portion of the light sensing element array.

21. A method of constructing a nuclear imaging detector, the method comprising:
defining a light sensing element array having a plurality of larger solid-state light sensing elements disposed in a central array and a plurality of smaller solid-state light sensing elements disposed in a peripheral array encircling around the central array;
optically coupling a scintillator to the light sensing element array.

22. The method according to claim 21, wherein the step of defining the light sensitive array includes defining smaller light sensing elements as at least one of squares and rectangles and the larger light sensing elements as integer multiples of the smaller light sensing elements.

23. A method according to claim 22, wherein the smaller light sensing elements located peripherally around the larger elements include smaller light sensitive elements of at least two different sizes.

* * * * *